No. 850,834. PATENTED APR. 16, 1907.
H. HEIDEMANN.
WINDOW FOR VEHICLES.
APPLICATION FILED JAN. 25, 1906.
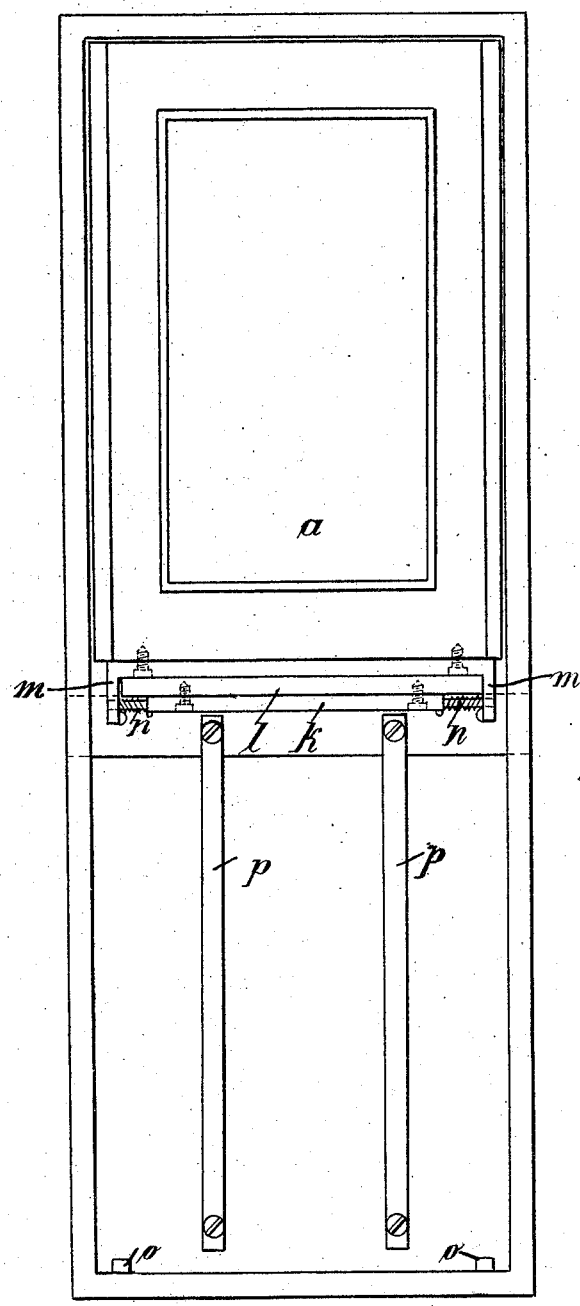
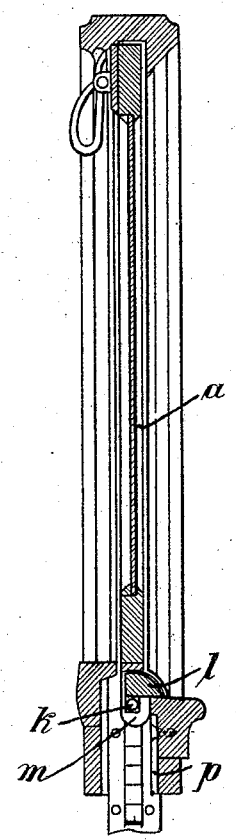

UNITED STATES PATENT OFFICE.

HEINRICH HEIDEMANN, OF HORSTERMARK, GERMANY.

WINDOW FOR VEHICLES.

No. 850,834.      Specification of Letters Patent.      Patented April 16, 1907.

Application filed January 25, 1906. Serial No. 297,914.

*To all whom it may concern:*

Be it known that I, HEINRICH HEIDEMANN, a subject of the German Emperor, and a resident of Horstermark, Germany, have invented certain new and useful Improvements in Windows for all Kinds of Vehicles, of which the following is a specification.

This invention relates to improvements in windows for all kinds of vehicles; and its object is to provide simple and effective means for preventing rain-water from penetrating through the window when closed, the arrangement being so disposed as to disappear entirely when the window is lowered.

The accompanying drawings show, by way of example, one suitable constructional form of a carriage-window embodying the invention.

Figure 1 is a front view of, and Fig. 2 a fragmentary longitudinal vertical section through, the same, showing how the new device is arranged.

The device is arranged at the lower window edge. The same comprises a weather-strip $l$ of sector-like cross-section which is fixed to a shaft $k$. The latter is movably mounted in bearings $m$, provided on the lower window edge and at both ends surrounded with spiral springs $n$, which are with one end fixed to the shaft $k$ and with the other end to the bearings $m$. Iron ribs $p$ are fixed to the inner side of the carriage-door, on which the weather-strip $l$ is adapted to slide downward.

The operation is as follows: When the window $a$ is being lowered, the weather-strip $l$ turns with its shaft $k$ in the bearings $m$, thus tensioning the springs $n$, and slides down the ribs $p$. In order to prevent the bearings $m$ when the window is being lowered to its deepest position from knocking against the base-rail of the door, rubber buffers $o$ are provided for this purpose. Upon the window being again totally closed the weather-strip is brought back to its tightening position by the action of the spiral spring $n$.

Having fully described my invention, what I claim, and desire to secure by Letters Patent, is—

A device for making windows of vehicles when closed water-tight, comprising in combination with the window $a$, bearings $m$ provided on the lower window edge, a shaft $k$ movably mounted in said bearings $m$, a weather-strip $l$ of sector-like cross-section fixed to said shaft $k$, spiral springs $n$ provided at both ends of said shaft $k$ and fixed with one end to said shaft $k$ and with the other end to said bearings $m$, iron ribs $p$ fixed to the inner side of the vehicle-door and adapted to receive said weather-strip $l$, and rubber buffers $o$ provided on the base-rail of the vehicle-door and destined to mitigate the shock on said rail, of said bearings $m$ when the latter are being lowered, substantially as described and shown.

In testimony whereof I have hereunto set my hand in the presence of two subscribing witnesses.

HEINRICH HEIDEMANN.

Witnesses:
    WILLIAM ESSENWEIN,
    PETER LIEBER.